US005743303A

United States Patent [19]

Leonhardt

[11] Patent Number: 5,743,303
[45] Date of Patent: Apr. 28, 1998

[54] LOW VOLUME, HIGH STRENGTH, HIGH MELTING POINT SINGLE JACKET ELASTOMER LINED FIRE HOSE

[75] Inventor: Duane Leonhardt, Dollard des Ormeaux, Canada

[73] Assignee: Mercedes Textiles Limited, Canada

[21] Appl. No.: 541,796

[22] Filed: Oct. 10, 1995

[51] Int. Cl.⁶ .................................................. F16L 11/02
[52] U.S. Cl. ............................ 138/126; 138/156; 138/119
[58] Field of Search ............................ 138/123–126, 138/153, 172, 119

[56] References Cited

U.S. PATENT DOCUMENTS

| | | | |
|---|---|---|---|
| 1,164,303 | 12/1915 | Nicewarner | 138/126 X |
| 2,009,075 | 7/1935 | Thompson | 138/126 |
| 2,329,836 | 9/1943 | Huthsing | 138/126 X |
| 3,056,429 | 10/1962 | Wilberg | 138/126 |
| 3,858,618 | 1/1975 | Kaufman | 138/124 X |
| 4,153,080 | 5/1979 | Murray, Jr. et al. | 138/126 |
| 4,850,395 | 7/1989 | Briggs | 138/30 |
| 4,989,643 | 2/1991 | Walton et al. | 138/126 |
| 5,351,366 | 10/1994 | Shaw | 24/122.6 |
| 5,361,806 | 11/1994 | Lalikos et al. | 138/125 X |

*Primary Examiner*—Patrick F. Brinson

[57] ABSTRACT

A woven single jacket elastomer lined fold flat fire hose comprised of fibers having a burst strength of at least 750 p.s.i., a melting point of at least 400° C., and a weight of between 0.05 and 0.08 lbs per foot.

2 Claims, No Drawings

LOW VOLUME, HIGH STRENGTH, HIGH MELTING POINT SINGLE JACKET ELASTOMER LINED FIRE HOSE

This invention relates to single jacket elastomer lined fire hose. More particularly this invention relates to a single jacket elastomer lined fire hose having a melting point of at least 400° C., a weight of between 0.05 and 0.08 lbs per foot and a volume of less than 0.18 cubic feet per 100 feet of hose when rolled.

Single jacket fire hose is currently woven from cotton blend, polyester or polyamid yarn or a blend thereof. Single jacket fire hose manufactured from cotton blend yarn is more resistant to flame and embers than is fire hose manufactured primarily from polyester or polyamid yarns. Single jacket fire hose manufactured from cotton blend yarn is substantially heavier than single jacket fire hose manufactured from polyester or polyamid yarns. Cotton blend yarns are more absorptive than polyester or polyamid yarns. Fire hose manufactured from cotton blend yarn is substantially heavier when wet than is single jacket fire hose comprised of polyester or polyamid yarns.

The problem with single jacket fire hose manufactured primarily from cotton blend yarns is that cotton blend yarns have relatively poor tensile strength relative to polyester or polyamid yarns of the same denier. In order to obtain a single jacket cotton blend fire hose having a suitable end strength a heavy denier cotton blend yarn must be used which results in a fire hose which is heavy. Cotton blend fire hose also absorbs water. A typical turn around time for cotton blend fire hose including drying is 8 to 10 hours. Polyester or polyamid single jacket fire hoses may be dried in several hours. Single jacket fire hose made from polyester or polyamid yarn is substantially stronger than fire hose made from cotton blend. Single jacket polyester or polyamid fire hose has a lower melting point than wet cotton blend fire hose and is more susceptible to damage from flames, heat and embers than is cotton blend fire hose.

The weight of single jacket fire hose and the volume of space in which single jacket fire hose can be stacked in trucks or airplanes is significant in moving single jacket fire hose from storage into the area of a forest fire where the fire hose can be used. Polyester or polyamid single jacket fire hose weigh substantially less and take substantially less space than comparable lengths of single jacket fire hose made from cotton blend yarn. The bulkier, heavier single jacket fire hose made from cotton blend yarn can withstand higher temperatures than comparable single jacket fire hose made of polyester or polyamid.

One embodiment of the invention relates to a woven single jacket elastomer lined fold flat fire hose comprised of fibers having a minimum burst strength of at least 750 p.s.i., a melting point of at least 400° C., and a weight of less than 7 pounds per hundred feet. In another embodiment the invention relates to a woven single jacket elastomer lined fold flat fire hose which has a volume of less than 0.140 cubic feet per 100 feet of fire hose when rolled.

The applicant sought a yarn suitable for use in a single jacket elastomer lined fire hose which could overcome the weight and strength deficiencies of single jacket cotton blend yarn fire hose but which provided heat resistance advantages found in single jacket cotton blend yarn fire hose. The applicant selected an aramid yarn suitable for use in a loom of the type used to weave single jacket fire hose. In manufacturing the elastomer lined fire hose, aramid yarn was used. The hose was manufactured on a loom. The warp was composed of 264 1000 denier aramid yarn. The 1½ inch, 38 millimeter diameter hose had 550 picks per meter. Immediately below the loom polyurethane was extruded on the inside of the woven single jacket fire hose as taught in U.S. Pat. No. 4,738,735 owned by the applicant herein.

The woven single jacket aramid yarn elastomer lined hose was tested for burst strength using Underwaters Laboratories test U.L.C.-S19-M90 entitled "Standard For Percolating Forestry Hose" and was found to have passed the burst strength requirement for single jacket (cotton blend) lined fire hose. The woven single jacket aramid yarn elastomer lined fire hose was also tested for fire retardency using U.L.C.-S19-M90 and passed the heat requirement for single jacket (cotton blend) lined fire hose. The weight of the woven single jacket aramid yarn elastomer lined fire hose was less than 0.07 lbs per foot. By contrast the weight of a typical single jacket woven cotton blend lined fire hose is 0.12 lbs per foot. The volume of a 100 foot length of single jacket aramid yarn woven fire hose having an elastomer lining as described above was 0.140 cubic feet when rolled whereas the comparable volume of 100 feet of typical single jacket cotton blend woven elastomer lined fire hose when similarly rolled was 0.272 cubic feet.

While reference is made in the example to a single jacket woven elastomer lined fire hose made from aramid yarn, the invention is not limited to single jacket woven elastomer lined fire hose woven from aramid yarns but extends to single jacket woven lined fire hose having one and one-half times the vertical strength, being at least one-quarter less in weight and volume, and having a heat resistance equal to typical single jacket woven lined fire hose manufactured from cotton blend. While reference has been made herein to percolating fire hose it will be recognized by those skilled in the art that this invention has equal application to non percolating hose meeting the standard U.L.C. 5518-M90 test entitled "Standard For Non-percolating Forestry Hose".

I claim:

1. A fire hose comprising an outer woven layer of aramid fibers having a burst strength of at least 750 p.s.i., a melting point of at least 400° C., a weight of between 5 pounds and 8 pounds per one hundred feet and an inner elastomer lining, said fire hose having a volume of less than 0.18 cubic feet per one hundred feet when rolled.

2. The fire hose of claim 1 which has a volume of less than 0.140 cubic feet per one hundred feet of fire hose when rolled.

* * * * *